UNITED STATES PATENT OFFICE.

EDWARD GOODRICH ACHESON, OF STAMFORD TOWNSHIP, CANADA, ASSIGNOR TO THE ACHESON COMPANY, OF NIAGARA FALLS, NEW YORK, A CORPORATION OF NEW JERSEY.

REFRACTORY MATERIAL.

SPECIFICATION forming part of Letters Patent No. 722,793, dated March 17, 1903.

Application filed November 20, 1902. Serial No. 132,170. (No specimens.)

*To all whom it may concern:*

Be it known that I, EDWARD GOODRICH ACHESON, a citizen of the United States, residing in Stamford township, in the county of Wellington, Province of Ontario, Canada, have invented certain new and useful Improvements in Refractory Materials, of which the following is a specification.

The object of my invention is to provide a refractory composition suitable for use as a refractory lining for furnaces or converters or as a material for fire-bricks, crucibles, muffles, twyers, &c.

I have found that an artificially-made composition containing silicon, oxygen, and carbon in chemical combination and which I designate as "siloxicon" is very refractory under high temperatures, insoluble in iron, is inert toward both acid and basic slags, and is readily shaped into any desired form of lining or article. The siloxicon is by preference ground to a powder, moistened with water, formed into the desired shape, and fired. When so treated, it forms a strong coherent mass. The material is self-binding, and the use of a separate binding agent is not essential in the manufacture of articles.

I have discovered that by heating carbon and silica or material containing these substances compounds containing silicon, oxygen, and carbon in chemical combination are produced which are practical substitutes for refractory clays, magnesia, lime, and graphite in their application to high temperatures and which present additional advantages, as hereinafter more fully stated.

In carrying out my invention I prefer to use an electrically-heated furnace of the general form described in my application Serial No. 124,991, wherein a plurality of zones of maximum and minimum temperatures are employed, although it will be evident that other forms of furnaces may be used without departing from my invention.

Carbid of silicon is made from carbon and silica mixed together in such proportions that the carbon present will be sufficient to reduce the silica and form a carbid with the freed silicon, and in practice there is a small excess of carbon present, this excess materially assisting in the reactions. I have discovered that when the amount of carbon present in the mixture is insufficient for the reduction of the silica and conversion of all the contained silicon into carbid the reduction of the silica is incomplete and a certain amount of oxygen is retained in chemical combination with the silicon, and compounds containing silicon, oxygen, and carbon are formed. Thus I have made in this way a compound corresponding approximately to the composition $Si_2C_2O$, which has been described by Colson as resulting from an oxidation of the compound $Si_4C_4S$ or from heating silicon in carbonic-acid gas. (C. R. 1882, 94, page 1526.) I have also made analogous compounds wherein the silicon and carbon are in atomic proportions, but wherein their ratio to the oxygen varies within considerable limits. For instance, I have produced a compound $Si_7C_7O$. I have further discovered that the successful manufacture of these compounds requires that the temperature of the furnace be kept below that of the formation of carborundum, as at or about that temperature decomposition occurs, possibly in accordance with this equation:

$$Si_7C_7O = 6SiC + Si + CO$$

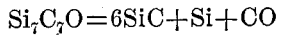

the silicon and carbon monoxid escaping from the furnace as vapor and gas, while the carbid of silicon remains in the furnace as carborundum-crystals. The proportions of carbon and silica in the charge may be varied. I find, for instance, that a considerable excess of carbon may be employed and that under suitable temperature conditions compounds of the character above indicated are formed, the excess of carbon remaining in the charge in a free state.

In carrying out my invention silica and carbon may be mixed together in suitable proportions, or carbonaceous and silicious materials, such as ordinary coke and carbonaceous shale, may be mixed in such proportion as to give the proper carbon and silicon content, or a carbonaceous shale containing the required amount of carbon and silicon may be used without addition. Thus if ground coke and sand be mixed together in such proportions that the silica content shall be to the carbon content as two is to one, and this mixture be placed in a suitable furnace and heated to and maintained at a definite high degree of temperature a reaction between the carbon and silica will occur, carbon-monoxid gas will be given off, and a compound containing silicon, oxygen, and carbon will remain in the furnace, which may be removed and used for many purposes—as, for instance, a refractory furnace-lining for the making of crucibles, twyers, bricks, muffles, &c. The temperature at which the reaction occurs has yet to be determined, but is lower than that at which carbid of silicon is formed.

As one example of my method I take of powdered carbon thirty-three and one-third per cent. and of powdered silica sixty-six and two-thirds per cent. and mix them thoroughly together. When the mixed materials are fine-grained, I add a little sawdust to increase the porosity, modifying the above mixture in view of the silica and carbon content of the sawdust. It will be understood that the silica content of the carbon is also considered in the preparation of the charge. The mixture is now charged into an electric furnace—for instance, the one illustrated in my application above referred to—and upon subjection for suitable period to a temperature below that required for the production of carbid of silicon the product is found to consist of the above-described chemical compound containing silicon, oxygen, and carbon.

With a furnace measuring fifty-six inches in length, twenty inches in width, and fourteen inches in depth, inside measurement, filled with the described mixture and containing two cores of granular coke three inches in diameter and forty-eight inches in length, the current was started with eighty-five volts and with five hundred amperes. The volts remained practically constant, the amperes soon increasing to six hundred, after which they remained practically constant to the end of the operation. The operation lasted nine hours. After cooling and opening the furnace all of that part of the charge occupying the space between and for a certain distance around the cores was found to be converted into loose granular or pulverulent amorphous material, which was gray-green when cold and light yellow when heated to 300° Fahrenheit or over. An analysis of the material gave the following composition, by weight: Si, 57.7; C., 25.9; iron, 2.1; aluminium, 0.4; calcium, trace; magnetism, trace; O., (by difference,) 13.9. Further tests showed the material to be very refractory, neutral in its behavior with both acid and basic slags, insoluble in molten iron, to have a specific gravity of 2.73, to be indifferent to all acids except hydrofluoric, which attacked it slowly, to resist the action of hot alkaline solutions, and when ground, moistened with water, molded into form and fired to yield a coherent mass.

Crucibles made of siloxicon are found to be superior to the crucibles of clay or of graphite and clay in common use in that they are not acted upon by the molten metal or slag or worn away externally by the action of the fuel or furnace gases.

I consider it preferable to utilize the self-binding properties of siloxicon in its various applications to articles or linings. In some instances, however, it may be preferable to use a binding agent—such, for instance, as hydrocarbons, as liquid tar, asphaltum or pitch, carbonaceous materials, as molasses or glue, or other agents, such as clay or magnesia. When a permanent binding agent is used, like liquid tar, the ground siloxicon and sufficient tar to bind it together are mixed thoroughly in hot condition, the resultant mass being then molded into the desired forms, which may then be burned, or they may be used without burning, in which case they receive the necessary burning while in their permanent combination, whereupon the volatile constituents of the tar are driven off, leaving a residue of carbon as a bond. When the siloxicon is to be used as a furnace-lining, it is sometimes preferable to prepare the mixture as when making articles and tap or ram it into place, where it later receives its final heating. I do not, however, limit myself to any particular method of forming compounds or the lining, but claim, broadly, a coherent mass containing silicon, oxygen, and carbon in chemical combination, however prepared.

What I claim is—

1. A self-binding material composed essentially of silicon, oxygen and carbon in chemical combination.

2. A coherent mass composed essentially of silicon, oxygen and carbon in chemical combination.

3. An amorphous self-binding material composed essentially of silicon, oxygen and carbon in chemical combination.

4. A coherent mass composed essentially of silicon, oxygen and carbon in chemical combination, and a binder.

5. A coherent refractory lining, brick, crucible or muffle, composed essentially of silicon, oxygen and carbon in chemical combination.

6. A coherent refractory lining, brick, crucible or muffle, composed essentially of silicon, oxygen and carbon in chemical combination, and a binder.

7. As a new article of manufacture, a compound containing silicon, oxygen and carbon in chemical combination, said compound being neutral toward acid or basic slags.

8. As a new article of manufacture, a compound containing silicon, oxygen and carbon in chemical combination, said compound being insoluble in molten iron.

9. As a new article of manufacture, a self-binding compound containing silicon, oxygen and carbon in chemical combination, said compound being neutral toward acid or basic slags, insoluble in molten iron, unaffected by furnace-gases, and capable of reacting with hydrofluoric acid.

In testimony whereof I have signed my name to this specification in the presence of two subscribing witnesses.

EDWARD GOODRICH ACHESON.

Witnesses:
F. L. FREEMAN,
W. CLARENCE DUVALL.